United States Patent
Hsiao et al.

(10) Patent No.: US 7,285,222 B2
(45) Date of Patent: Oct. 23, 2007

(54) METHOD FOR RECYCLING SLUDGE DURING WASTE-WATER TREATMENT

(75) Inventors: Hung-Yuan Hsiao, Tainan (TW); Min-Shing Tsai, Tainan (TW); Li-Hsing Shih, Tainan (TW); Hung-Ta Chen, Tainan (TW); Yeu-Juin Tuan, Tainan (TW)

(73) Assignee: National Cheng Kung University, Tainan (TW)

( * ) Notice: Subject to any disclaimer, the term of this patent is extended or adjusted under 35 U.S.C. 154(b) by 235 days.

(21) Appl. No.: 11/150,727

(22) Filed: Jun. 13, 2005

(65) Prior Publication Data

US 2006/0278583 A1 Dec. 14, 2006

(51) Int. Cl.
  C02F 1/62 (2006.01)
  C02F 101/20 (2006.01)
  C02F 11/14 (2006.01)

(52) U.S. Cl. ............... 210/711; 210/713; 210/725; 210/727; 210/737; 210/912; 210/913; 423/36

(58) Field of Classification Search ........... 210/711
See application file for complete search history.

(56) References Cited

U.S. PATENT DOCUMENTS

| | | | | | |
|---|---|---|---|---|---|
| 4,343,706 | A | * | 8/1982 | Etzel et al. | 210/667 |
| 4,880,495 | A | * | 11/1989 | Petraitis et al. | 216/93 |
| 5,059,403 | A | * | 10/1991 | Chen | 423/24 |
| 5,102,556 | A | * | 4/1992 | Wong | 210/711 |
| 5,599,458 | A | * | 2/1997 | Taboga | 210/710 |
| 5,855,793 | A | * | 1/1999 | Ikeda et al. | 210/711 |
| 5,888,404 | A | * | 3/1999 | Jokinen | 210/711 |

* cited by examiner

*Primary Examiner*—Peter A. Hruskoci

(57) ABSTRACT

A method for recycling sludge during waste-water treatment firstly utilizes a process of chemical coagulation to produce sludge rich in copper ions. The sludge is then leached in a sulfuric acid storage tank with sulfuric acid of concentration 1-2N, whereby a extractive solution with copper enrichment 18-39 g/L and residues can be obtained. The extractive solution is then processed in a refrigeration crystallization tank to form copper sulfate crystals. Further, the residues produced are added into the coagulation tank as a coagulant in the process of chemical coagulation for wastewater treatment, thereby achieving a goal of zero sludge production.

2 Claims, 2 Drawing Sheets

METHOD FOR RECYCLING SLUDGE DURING WASTE-WATER TREATMENT

BACKGROUND OF THE INVENTION

1. Field of the Invention

The present invention relates to methods for recycling sludge during waste-water treatment, more particularly to a method for recycling sludge during waste-water treatment whereby sludge of high concentration of copper ions will be leached in sulfuric acid of concentration 1-2N, and, through a process of separating liquid and solid, a solution rich in copper (18-39 g/L) and residues will be obtained. The liquid extractive is then processed in a refrigeration crystallization tank to form copper sulfate crystals. Further, the residues produced are added into the coagulation tank as a coagulant in the process of chemical coagulation for wastewater treatment, thereby achieving a goal of zero sludge production.

2. Description of the Prior Art

The development of industries such as printed circuit board manufacture, metal processing, chemical material production, electroplating, and leather processing facilitates our daily life but at the same time produces a variety of wastes that cause impacts on the environment, especially heavy metal sludge. The amount of heavy metal sludge produced annually in Taiwan has exceeded 320,000 metric tons.

The most frequently used treatment of heavy metal wastewater of the prior art is chemical coagulation and precipitation, whose process is shown in FIG. 1. The system that carries out the process includes: a waste-water equalization tank 11 for storing raw waste-water and for adjusting the variable concentration on the waste-water; a coagulation tank 12 for adding a coagulant so as to increase the concentration of metallic ions; a pH adjustment tank 13 for adjusting the pH value of the waste-water so that the water is basic, thereby facilitating the formation of metallic hydroxides; a flocculated tank 14 for adding a polymer flocculating agent for accelerating the precipitation of the metallic hydroxides; a precipitation tank 15 for separating the metallic hydroxides and the upper-layer waste-water; a filtering unit 16, further comprising a water draining tank 160, a sand filter 161, and an active carbon adsorption apparatus 162, for filtering off other impurities and materials that deteriorate water quality within the upper-layer waste-water; a neutralization and effluent tank 17 for adjusting the pH value of processed water so that it can be released; a sludge thicken tank 18 for enriching the precipitated materials on the bottom of the precipitation tank 15 and for driving the upper-layer water back to the waste-water equalization tank 11 so as to get mixed with the raw waste-water therein; and a sludge hydro-extractor 19 for dehydrating the sludge from the sludge thicken tank 18.

The above process processes waste-water into effluent water and cakes of concentrated heavy metal sludge. The effluent water will be released to the environment, and the sludge cakes will be going through other treatment processes or simply put into a terminal storage.

However, the conventional method of chemical coagulation may produce effluent water that satisfies an environmental standard, but it induces a large amount of heavy metal sludge, which is more hazardous to the environment if not processed well. Further, the treatment of the sludge will increase the cost.

Based on the disadvantage of the conventional method of chemical coagulation, the present invention utilizes the method of hydrometallurgy to extract the copper element from the heavy metal sludge. The pernicious heavy metal sludge is leached in sulfuric acid for dissolving the copper therein, which copper is then collected by an enrichment technique, such as the copper sulfate recycling method. Further, the residues produced in a filtering process are used as the coagulant in the process of chemical coagulation for wastewater treatment, replacing the conventional coagulants such as $FeCl_3$, PAC, $FeSO_4$ and therefore achieving a goal of zero sludge production.

SUMMARY OF THE INVENTION

Accordingly, the primary objective of the present invention is to provide a method for recycling sludge during waste-water treatment whereby the sludge produced in a process of chemical coagulation for treating heavy metal liquid waste is leached in sulfuric acid for recycling the copper therein. Further, the residues produced in a filtering process are used as the coagulating agent in the process of chemical coagulation for wastewater treatment, achieving a goal of zero sludge production.

To achieve above object, the present invention provides a method for recycling sludge during waste-water treatment, comprising the steps of: chemical coagulation whereby sludge of high concentration of copper ions is produced; sulfuric acid leaching wherein the sludge is leached in sulfuric acid of concentration 1-2N, whereby a copper-rich solution and residues are separated, the solution having a copper content attaining 18-39 g/L and residues can be obtained; and refrigeration and crystallization whereby the solution is transformed into copper sulfate crystals of high economic value. The sludge is recycled for extracting copper and the residues are reused as a coagulant in the step of chemical coagulation, achieving a goal of zero sludge production.

The various objects and advantages of the present invention will be more readily understood from the following detailed description when read in conjunction with the appended drawings.

DETAILED DESCRIPTION OF THE PREFERRED EMBODIMENT

A method for recycling sludge during waste-water treatment according to the present invention is for treating the sludge produced in a process of chemical coagulation for waste-water treatment. The pernicious heavy metal sludge is leached in sulfuric acid for dissolving the copper therein, which copper is then collected by an enrichment technique, such as the copper sulfate recycling method. Further, the residues produced in a filtering process are used as the coagulant in the process of chemical coagulation, replacing the conventional coagulants such as $FeCl_3$, PAC, $FeSO_4$ and therefore achieving a goal of zero sludge production.

Figure 1:
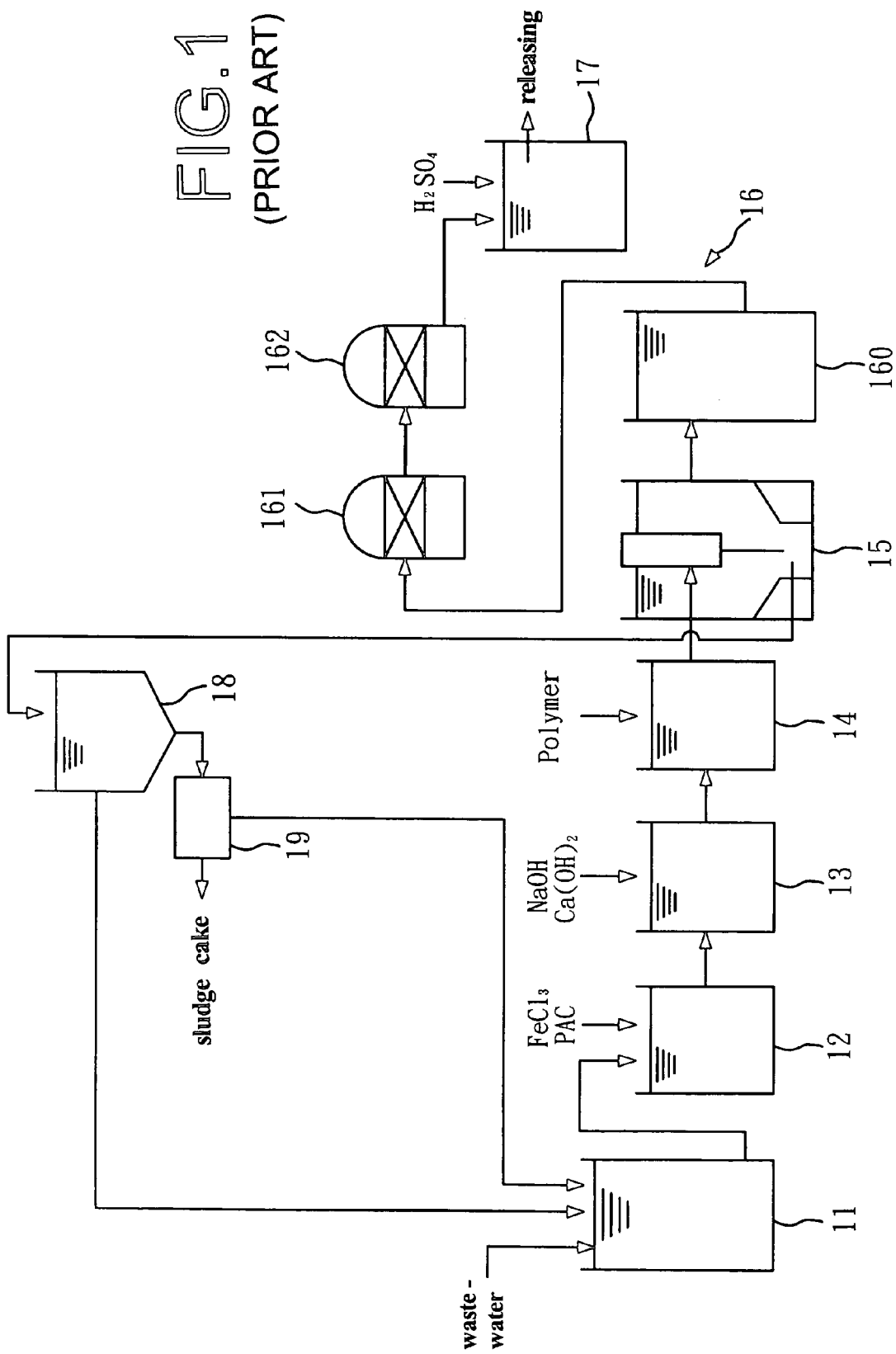
FIG. 1 is a system diagram for the wastewater treatment process of chemical coagulation of the prior art.
Figure 2:
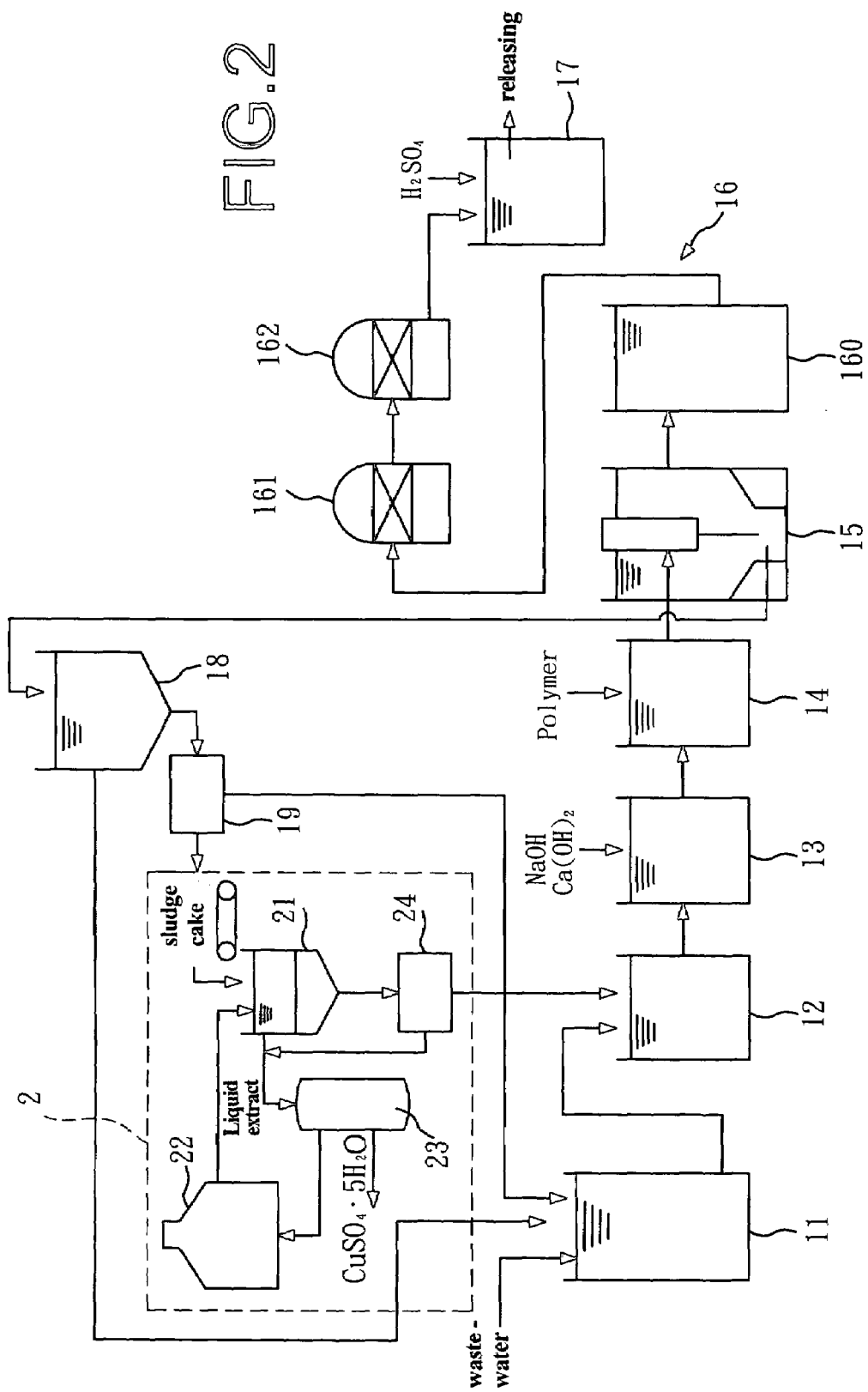
FIG. 2 is a system diagram showing the process and the instruments of the present invention.

Referring to FIG. 2, a system for removing sludge during waste-water treatment according to the present invention comprises: a waste-water equalization tank 11 for storing raw waste-water and for adjusting the effect of concentration variation on the waste-water; a coagulation tank 12 for adding a coagulant so as to increase the concentration of metallic ions; a pH adjustment tank 13 for adjusting the pH value of the waste-water so that the water is basic, thereby facilitating the formation of metallic hydroxides; a flocculated tank 14 for adding a polymer flocculating agent for accelerating the precipitation of the metallic hydroxides; a precipitation tank 15 for separating the metallic hydroxides and the upper-layer waste-water;

a filtering unit 16, further comprising a water draining tank 160, a sand filter 161, and an active carbon adsorption apparatus 162, for filtering off other impurities and materials that deteriorate water quality within the upper-layer waste-water; a neutralization and effluent tank 17 for adjusting the pH value of processed water so that it can be released; a sludge thicken tank 18 for enriching the precipitated materials on the bottom of the precipitation tank 15 and for driving the upper-layer water back to the waste-water equalization tank 11 so as to get mixed with the raw waste-water therein; and a sludge hydro-extractor 19 for dehydrating the sludge from the sludge thicken tank 18.

Further, the main characteristic of the sludge hydro-extractor 19 of the present invention is an acid leaching tank 21 disposed after the sludge hydro-extractor 19, whereby the sludge from the sludge hydro-extractor 19 is leached in sulfuric acid ($H_2SO_4$) of concentration 1-2N injected from an adjacent sulfuric acid storage tank 22, and whereby a liquid extract rich in copper will be acquired. If the copper content in the liquid extract is higher than 20 gram per liter, it will be a recyclable resource. Further, the system may comprise a refrigeration crystallization tank 23 connected to the acid leaching tank 21, whereby copper sulfate crystals ($CuSO_4 5H_2O$) can be produced. Further, the sulfuric acid solution from the refrigeration crystallization tank 23 can be recycled and put back to the sulfuric acid storage tank 22. The residues precipitated on the bottom of the acid leaching tank 21 is dehydrated in a hydro-extractor 24 and then added to the coagulation tank 12 as a coagulant. Therefore, there is a pipeline between the acid leaching tank 21 and the coagulation tank 12 for transporting the coagulant.

Thereby, the treated effluent-water by the system will satisfy the standard for water effluent. At the same time, solution rich in copper is produced, which can be used a raw material for extracting copper. Further, since the sludge produced during the process goes through repeated processes of copper extraction and residue recycling, the whole process virtually produces no sludge.

The following is an example showing the benefit of using the present invention in a plant for manufacturing printed circuit boards. Table 1 shows the main units and their operation conditions of the waste-water treatment in a typical plant for manufacturing printed circuit boards.

TABLE 1 the main units and their operation conditions of the waste-water treatment in a typical plant for manufacturing printed circuit boards

| Processing unit | additive | Operation speed (rpm) | Operation time |
|---|---|---|---|
| coagulation tank | $FeCl_3$ | 180 | 5 |
| pH adjustment tank | NaOH | 180 | 5 |
| flocculated tank | polymer | 180 | 3 |
| precipitation tank | — | — | 5 |

Firstly, a 800 g sample of the heavy metal precipitated sludge from the plant is taken and placed in a sulfuric acid solution of concentration 1-2N. The residues filtered out from the solution are added into the coagulation tank to replace the $FeCl_3$ therein, with a reaction volume of 30 liters. The operation conditions for the rest of the processing units remain the same as those listed in Table 1 After completing the waste-water treatment, the first batches of effluent water and sludge are collected.

The first batch of sludge is reprocessed with the process of acid leaching to retrieve the first batches of liquid extract and residues. The first batch of residues is added to the coagulation tank as a coagulant for the continuing treatment of waste-water. The following table lists a comparison of the performance between the current treatment and three runs of the present invention.

TABLE 2 a comparison of the performance between the current treatment and three runs of the present invention (ppm)

| | lead | cadmium | chromium | copper | zinc | nickel | iron |
|---|---|---|---|---|---|---|---|
| original effluent water | <0.1 | <0.01 | <0.05 | 1.85 | 0.13 | <0.05 | 0.62 |
| the first batch of effluent water | <0.1 | <0.01 | <0.05 | 0.44 | <0.05 | 0.22 | <0.5 |
| the second batch of effluent water | 0.23 | <0.01 | <0.05 | 1.18 | <0.05 | 0.12 | <0.5 |
| the third batch of effluent water | 0.16 | <0.01 | <0.05 | 0.38 | <0.05 | 0.12 | <0.5 |
| a standard of effluent water | 1.0 | 0.03 | 2.0 | 3.0 | 5.0 | 1.0 | 10 |

The copper ions in the sludge are leached out by a percentage of 43-61% in the step of acid leaching, as shown in Table 3. The concentration of the copper ions ranges between 18 g/L and 39 g/L, which is shown in Table 4.

TABLE 3 the extraction percentage of the copper ions from sludge leached in sulfuric acid of concentration 1–2N.

| $H_2SO_4$ concentration (N) | solid-to-liquid ratio | total weight of copper ions in the solids before leaching (mg) | total weight of extracted copper ions in the leaching solution (mg) | Extraction percentage of the copper ions (%) |
|---|---|---|---|---|
| 1 | 1/5 | 42320 | 18972 | 44.83 |
| 1 | 1/5 | 56342 | 25398 | 45.08 |
| 1 | 1/5 | 89604 | 39077 | 43.61 |
| 1 | 1/5 | 44396 | 19321 | 43.52 |

TABLE 3-continued the extraction percentage of the copper ions from sludge
leached in sulfuric acid of concentration 1–2N.

| $H_2SO_4$ concentration (N) | solid-to-liquid ratio | total weight of copper ions in the solids before leaching (mg) | total weight of extracted copper ions in the leaching solution (mg) | Extraction percentage of the copper ions (%) |
|---|---|---|---|---|
| 1 | 1/10 | 74546 | 38972 | 52.28 |
| 2 | 1/5 | 62107 | 32272 | 51.96 |
| 2 | 1/10 | 63418 | 38756 | 61.11 |

TABLE 4 the results from the analysis of the liquid extract (ppm)

| | lead | cadmium | chromium | copper | zinc | nickel | iron |
|---|---|---|---|---|---|---|---|
| the first batch of extract solution | 1.42 | 0.85 | 0.48 | 18972 | 1758 | 257 | 3258 |
| the second batch of extract solution | 0.42 | 0.26 | 0.09 | 25398 | 358 | 92.5 | 33.2 |
| the first batch of extract solution | 0.34 | 0.01 | 0.07 | 39077 | 45.0 | 21.0 | 28.9 |

The present invention can be used with other heavy metal enriching devices, for example, a recycling machine for copper sulfate crystals, to retrieve valuable heavy metals. Since the sludge is either recycled for copper or forms residues that will be used as a coagulant, there is no net production of sludge.

As indicated by the above examples, the utilization of the present invention in a plant for manufacturing printed circuit board will save the cost of treating 140 tons of sludge and consuming 50 tons of coagulant. Further, the solution of high copper content or the copper sulfate crystals produced in the sulfuric acid leaching are of economic value.

To sum up, the present invention has the following advantages:

1. Producing effluent water meeting a high standard of environmental protection and a solution containing copper;
2. Virtually producing no sludge, since the intermediate sludge is either recycled for copper or forms residues that will be used as a coagulant;
3. Extracting a solution of high copper content or copper sulfate crystals in the sulfuric acid leaching, both of which are of high economic value;
4. Cutting down costs of treating sludge and consumption of coagulant;
5. Omitting processing units of waste-water and sludge, since the waste-water containing copper is recycled.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for recycling sludge during waste-water treatment, comprising the steps of:

chemical coagulation for production of a sludge including copper ions;

sulfuric acid leaching wherein said sludge is leached in sulfuric acid of concentration 1-2N, a copper-rich solution and residues are separated, said solution having a copper content attaining 18-39 g/L; and refrigeration and crystallization for transforming said solution into copper sulfate crystals;

wherein said sludge is recycled to produce said copper sulfate crystals, and said residues are reused as a coagulant in said step of chemical coagulation, achieving a goal of zero sludge production; and wherein said step of chemical coagulation further comprises the steps of:

(1) waste-water equalizing in a waste-water equalization tank for storing raw waste-water and for adjusting the variable effect of concentration on said waste-water;

(2) mixing said waste-water with a coagulant including said residues in a coagulation tank for increasing the concentration of metallic ions;

(3) adjusting the pH value of said waste-water in a pH adjustment tank for making said waste-water basic, thereby facilitating the formation of metallic hydroxides;

(4) adding a polymer flocculating agent to said waste-water in a flocculated tank for accelerating the precipitation of said metallic hydroxides;

(5) separating said metallic hydroxides and upper-layer waste-water in a precipitation tank;

(6) filtering out impurities and materials that deteriorate water quality within said upper-layer waste-water in a filtering unit;

(7) adjusting the pH value of said upper-layer waste-water in a neutralization and effluent tank so that said upper-layer waste-water satisfies a standard of effluent water;

(8) sending a solid sludge to a sludge thicken tank, guiding metallic hydroxides precipitated at a bottom of said precipitation tank into said sludge thicken tank for enrichment, sending liquid induced in said step of sludge thicken back to said waste-water equalization tank to mix said raw waste-water therein; and (9) dehydrating said sludge from said sludge thicken tank in a sludge hydro-extractor; to produce said sludge including copper ions.

2. The method for recycling sludge during waste-water treatment of claim 1 wherein a sulfuric acid solution produced in said step of refrigeration and crystallization is reused in said step of sulfuric acid leaching.

* * * * *